United States Patent
Neumann et al.

(10) Patent No.: US 11,266,935 B2
(45) Date of Patent: Mar. 8, 2022

(54) FILTER MEDIUM, METHOD FOR PRODUCING SAME, AND USE OF THE FILTER MEDIUM IN A FILTER ELEMENT

(71) Applicant: MANN+HUMMEL GmbH, Ludwigsburg (DE)

(72) Inventors: Jens Neumann, Stuttgart (DE); Heiko Brosi, Oberstenfeld (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/442,480

(22) Filed: Jun. 15, 2019

(65) Prior Publication Data

US 2019/0299133 A1    Oct. 3, 2019

Related U.S. Application Data

(63) Continuation of application No. PCT/EP2017/082393, filed on Dec. 12, 2017.

(30) Foreign Application Priority Data

Dec. 15, 2016   (DE) .................. 102016014894.2

(51) Int. Cl.
*B01D 39/18*     (2006.01)
*B01D 39/16*     (2006.01)

(52) U.S. Cl.
CPC ......... *B01D 39/1623* (2013.01); *B01D 39/18* (2013.01); *B01D 2239/025* (2013.01); *B01D 2239/0668* (2013.01); *B01D 2239/10* (2013.01); *B01D 2239/1233* (2013.01)

(58) Field of Classification Search
CPC ............... B01D 39/1623; B01D 39/18; B01D 2239/025; B01D 2239/0668; B01D 2239/10; B01D 2239/1233
See application file for complete search history.

(56) References Cited

FOREIGN PATENT DOCUMENTS

| | | | |
|---|---|---|---|
| CN | 104722216 A | 6/2015 | |
| DE | 10249998 B3 | 5/2004 | |
| DE | 202010009671 U1 | 2/2010 | |
| DE | 202010009671 U1 * | 10/2010 | ......... B01D 39/1623 |
| EP | 1366791 A1 * | 12/2003 | .......... B01D 39/163 |
| EP | 1366791 A1 | 12/2003 | |
| EP | 1985349 A2 | 10/2008 | |
| EP | 1985349 B1 | 10/2008 | |
| EP | 2006009 B1 | 12/2008 | |
| WO | 2010009043 A2 | 1/2010 | |
| WO | 2012023996 A1 | 2/2012 | |

* cited by examiner

Primary Examiner — Waqaas Ali

(57) ABSTRACT

A filter medium has a substrate layer and a nanofiber layer arranged on the substrate layer. Adhesive fibers are laid onto the nanofiber layer and connect the nanofiber layer with the substrate layer. The nanofiber layer is located between the substrate layer and the adhesive fibers.

13 Claims, 6 Drawing Sheets

FILTER MEDIUM, METHOD FOR PRODUCING SAME, AND USE OF THE FILTER MEDIUM IN A FILTER ELEMENT

CROSS-REFERENCE TO RELATED APPLICATIONS

This application is a continuation application of international application No. PCT/EP2017/082393 having an international filing date of 12 Dec. 2017 and designating the United States, the international application claiming a priority date of 15 Dec. 2016 based on prior filed German patent application No. 10 2016 014 894.2, the entire contents of the aforesaid international application and the aforesaid German patent application being incorporated herein by reference.

BACKGROUND OF THE INVENTION

The invention concerns a filter medium comprising a substrate layer and a nanofiber layer as well as a method for its production, and two uses of this filter medium.

EP 1 985 349 A2 discloses a filter medium in which two nonwoven layers are connected to each other by hot-melt adhesive fibers. In this context, the hot-melt adhesive fibers themselves are embodied as nanofibers and serve for connecting two filter layers. This nanofiber layer does not take on a filtration task; rather, the small fiber diameter of this nanofiber layer in EP 1 985 349 A2 serves to finely distribute the adhesive connection with minimal contact surface.

EP 2 006 009 A1 discloses a filter medium with several filter layers. The respective filter layers or tiers can be comprised, for example, of meltblown fibers or nanofibers and arranged on a support layer which comprises hot-melt adhesive fibers for connection of the filter layer. In EP 2 006 009 A1, optionally an additional microfiber layer of nanofibers and meltblown fibers may be provided. In EP 2 006 009 A1, the support layer thus contributes the material properties required for connection of the filter layer with the nanofibers. The disadvantage in using hot-melt adhesive fibers in the support layer is that the nanofibers, provided that they form the outermost layer, during further processing, e.g., by deflection of the filter web across cylinders and rollers, by coiling, embossing, and folding, can become damaged. In addition, damage can occur during manual handling of the finished filter element as well as its installation. Also, an Aoutwardly positioned@ nanofiber layer may become damaged in difficult filtration conditions, e.g., at high volume flow, differential pressure and/or high viscosity of the medium.

SUMMARY OF THE INVENTION

It is therefore an object of the present invention to protect the surface of the nanofibers from mechanical damage and to provide at the same time a connection with a support layer neighboring the nanofiber layer.

This object is solved by a filter medium according to the invention that includes a substrate layer and a nanofiber layer, wherein the nanofiber layer is connected with the substrate layer by adhesive fibers and/or hot-melt adhesive fibers, wherein the nanofiber layer is located, in the sequence of layers, between the substrate layer and the adhesive fibers and/or hot-melt adhesive fibers.

In contrast to EP 2 006 009 A1, the adhesive fibers and/or hot-melt adhesive fibers are applied to the nanofiber layer from the side opposite the substrate layer so that the nanofiber layer is sort of framed.

While in the prior art the nanofibers sink only slightly into the hot-melt adhesive fibers of the substrate layer and therefore no protection from mechanical damage is achieved, the hot-melt adhesive fibers applied surficially in the context of the present invention provide an effective protection, e.g., handling protection, i.e, a protection from abrasion of the nanofibers, due to the hot-melt adhesive fibers projecting past the nanofibers. In other words, the hot-melt adhesive fibers provide an adhesive connection of the nanofiber layers with a substrate layer and, in addition, provide a protective effect against abrasion of the nanofibers.

The hot-melt adhesive fibers contact also the substrate layer so that a connection, in particular a material fusion connection, between the nanofiber layer and the substrate layer is enabled.

Alternatively, in the context of the present invention, it is also possible to use adhesive fibers, thus fibers with which adhesive connections can be produced due to their dissolving properties or melting properties, wherein they can be chemically or physically curing and/or the already mentioned hot-melt adhesive fibers, i.e., hot-melt adhesives (also referred to as hotmelts) in fiber form, wherein the hot-melt adhesive fibers are thermally meltable adhesive systems that develop cohesion (inner strength) by cooling. Hot-melt adhesive fibers can be thermoplastic or reactive. Thermoplastic hot-melt adhesives can be reversibly melted. Reactive hot-melt adhesives exhibit chemical cross-linking reactions during or after cooling. Suitable basic polymers for hot-melt adhesives encompass polyamide (PA), polyethylene (PE), amorphous polyalphaolefins, poly(ethylene-co-vinyl acetate) polymers (PEVA), polyester elastomers (TPE-E), polyurethane elastomers (TPE-U), copolyamide elastomers (TPE-A), and vinyl pyrrolidone/vinyl acetate copolymers. According to the invention, the nanofiber layer, in the sequence of layers, is located between the substrate layer and the adhesive fibers and/or hot-melt adhesive fibers. In other words, the adhesive fibers and/or hot-melt adhesive fibers in the arrangement of layers are located on an existing composite of substrate layer and nanofiber layer so that the hot-melt adhesive fiber layer according to the invention is always arranged at an exterior side of the filter medium.

The hot-melt adhesive fibers can be laid randomly or in an ordered fashion, e.g., in the form of endless fibers with a net structure, onto the nanofibers. The hot-melt adhesive fibers can be partially connected with the substrate layer.

Advantageous embodiments of the invention are subject matter of the dependent claims.

In contrast to EP 1 985 349 A2, the nanofiber layer of the filter medium can be provided for fine filtration of a medium in particular downstream of a filtration through the substrate layer, provided that the nanofiber layer is arranged at the outflow side relative to the substrate layer. Alternatively, the nanofiber layer can be provided for surface filtration, provided that the nanofiber layer is arranged at the inflow side relative to the substrate layer and provided that the substrate layer is a closed web medium without filter function.

The nanofibers of the nanofiber layer may comprise advantageously an average fiber diameter in a range from 50 nm to 500 nm, preferably in a range from 70 nm to 150 nm. This fiber diameter is particularly preferred for filtration of especially fine particles from a medium to be filtered.

An advantageous variant of nanofibers are polyamide nanofibers.

The substrate layer can advantageously be embodied as a nonwoven layer which comprises at least 90 wt % of cellulose fibers and/or synthetic fibers. In this case, it is possible that the substrate layer also comprises a filter function. For processing the filter medium, it is in particular advantageous when the substrate layer is embodied as a carded nonwoven and/or spunbonded nonwoven.

The adhesive fibers and/or hot-melt adhesive fibers can advantageously have a melting point which is at least 30° C. below the melting point of the nanofibers of the nanofiber layer. In this way, when applying the hot-melt adhesive fibers in the partially liquefied state, no formation of a melted region across a large surface area occurs by simultaneous melting of the nanofibers whereby the filtering performance of the nanofiber layer would be reduced.

Advantageously, the maximum melting point of the hot-melt fibers is 220° C. In contrast, the melting point of conventional polyamide nanofibers is 240° C.

For providing a large filtration surface area and at the same time a sufficient protection from mechanical loads, more than 70%, preferably more than 90%, of a surface area of the nanofiber layer can be arranged, without being covered, at the inflow side or outflow side relative to the substrate layer.

This is at the same time a further differentiating feature relative to the embodiment variant described in EP 1 985 349 A2 in which the nanofiber layer is completely covered at both sides, i.e., at both surfaces, by a further nonwoven layer.

The adhesive fibers and/or hot-melt adhesive fibers can advantageously comprise a cross-sectional area of the fiber, i.e., the perpendicular sectional area through a fiber, which is at least three times, preferably at least eight times, that of the cross-sectional area of the nanofibers of the nanofiber layer. In this way, a broad frame for a particularly good mechanical protection is enabled.

The adhesive fibers and/or hot-melt adhesive fibers may comprise a thermoplastic synthetic material and, particularly preferred, may consist of a thermoplastic synthetic material so that the connection of the substrate layer and of the nanofiber layer is primarily realized by melting of the fibers.

The thermoplastic synthetic material of the adhesive fibers and/or hot-melt adhesive fibers can be selected advantageously from one or a plurality of polyolefin compound or polyolefin compounds, polyester compound or polyester compounds, polyurethane compound or polyurethane compounds and/or polyamide compound or polyamide compounds. Suitable basic polymers for hot-melt adhesives encompass polyamides (PA), polyethylene (PE), amorphous polyalphaolefins, poly(ethylene-co-vinyl acetate) polymers (PEVA), polyester elastomers (TPE-E), polyurethane elastomers (TPE-U), co-polyamide elastomers (TPE-A) and vinyl pyrrolidone/vinyl acetate copolymers.

The hot-melt adhesive fibers may delimit advantageously a window or a frame cutout wherein the average window size of a surface section is preferably at least 500 μm² per cm².

The filter medium can consist exclusively of the substrate layer, the nanofiber layer, and the hot-melt adhesive fibers. Further material layers are not provided in this advantageous embodiment variant so that a good foldability of the filter medium can be ensured.

In a preferred further embodiment variant, the hot-melt adhesive fibers can be fused to the substrate layer at least in sections thereof. Also, the nanofibers of the nanofiber layer have fused spots as connecting points with the hot-melt adhesive fibers. In this embodiment, the hot-melt adhesive fibers penetrate the nanofiber layer and provide for a particularly advantageous adhesive connection of the nanofiber layers with the support and, in addition, the protective action against abrasion of the nanofibers is achieved.

The nanofibers of the nanofiber layer and the substrate layer can each have connecting regions with the adhesive fibers and/or hot-melt adhesive fibers in which a material fusion between the adhesive fibers and/or hot-melt adhesive fibers with the nanofibers of the nanofiber layer or the substrate layer is realized.

A method for producing a filter medium according to one of the preceding claims comprises at least the following steps:
A providing a substrate layer;
B arranging a nanofiber layer on the substrate layer; and
C arranging adhesive fibers and/or hot-melt adhesive fibers on the nanofiber layer with formation of a connection between the substrate layer and the nanofiber layer.

A use of the filter medium according to the invention can be realized particularly preferred in folded, embossed and/or wound form in a filter element or as wrapping of one or more layers of an exterior of a filter element. Preferred fields of application are industrial filters and filters in internal combustion engines, e.g., in vehicles, ships, and stationary machines.

BRIEF DESCRIPTION OF THE DRAWINGS

In the following, the invention will be explained in more detail based on an embodiment with the aid of several Figures.

The Figures show only examples and are not to be understood as limiting.

DESCRIPTION OF PREFERRED EMBODIMENTS

Figure 1:
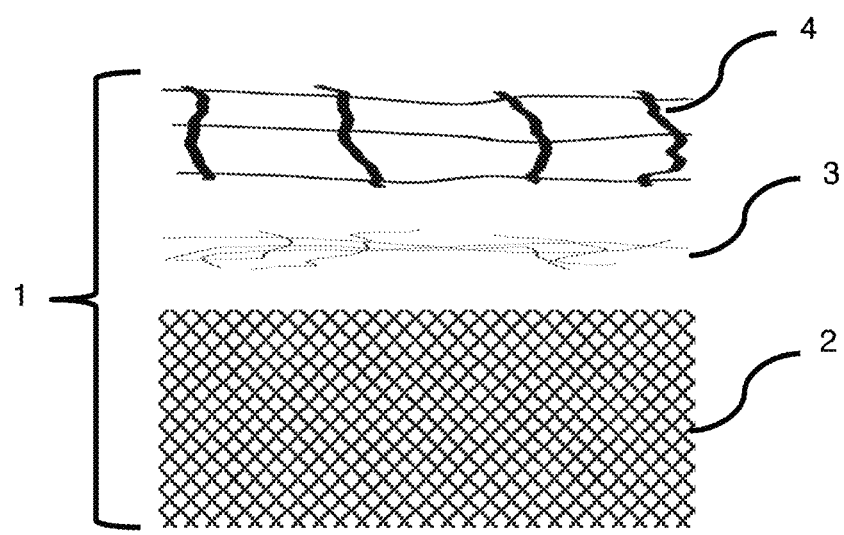
FIG. 1 is a schematic illustration of a filter medium according to the invention.

FIG. 1 shows an embodiment of a filter medium 1 according to the invention with a substrate layer 2 that is preferably embodied as first fiber layer and with at least one nanofiber layer 3 arranged at the inflow side or outflow side on the substrate layer and embodied as a second fiber layer.

The substrate layer 2 can be preferably embodied as a nonwoven layer and particularly preferred as a carded nonwoven or spunbonded nonwoven. It comprises preferably fibers 2a with an average fiber diameter of preferably more than 1 μm, in particular in a range from 3 μm to 50 μm.

The substrate layer 2 in a preferred embodiment variant can comprise more than 90 wt % synthetic fibers and/or cellulose fibers. The remaining wt % up to 100 wt % comprise impregnation additives for mechanical and chemical stabilization and binding agents. The substrate layer 2 itself must not exhibit an essential filter function but can serve mainly for stabilizing the filter medium, in particular the additional fiber layer which is arranged thereon. Alternatively, the substrate layer can also be designed as a prefilter layer which in particular filters out coarser particles from the medium flow.

The substrate layer 2 can be embodied preferably as a carrier layer for a nanofiber layer 3 that is arranged preferably immediately adjacent thereto. The individual fibers of the nanofiber layer 3 comprise an extremely minimal fiber diameter and the applied layer is structurally comparable to a fine spider web. A correspondingly high tendency for destruction of the nanofiber layer 3 therefore exists and this tendency is to be counteracted.

The fibers 3a of the nanofiber layer 3 comprise preferably an average fiber diameter in a range from 50 nm to 500 nm, preferably in a range from 70 nm to 150 nm. The average fiber diameter can be determined according to DIN 53811: 1970-07.

The nanofiber layer 3 can be arranged, for example, at the inflow side or outflow side relative to the substrate layer 2. In this way, an advantageous stabilization by the hot-melt fibers can be achieved.

When the nanofiber layer 3 is arranged at the outflow side relative to the substrate layer 2, the substrate layer 2 is preferably embodied as a filter layer, in particular as a nonwoven layer for filtration. The nanofiber layer 3 serves in this context for fine filtration of the medium.

When the nanofiber layer 3 is arranged at the inflow side relative to the substrate layer 2, then the nanofiber layer 3 serves for surface filtration. The substrate layer 2 arranged at the outflow side relative to the nanofiber layer 3 must have hardly any filtration properties in this embodiment variant.

The nanofiber layer 3 and the substrate layer 2 are connected to each other by adhesive fibers and/or hot-melt adhesive fibers 4. The adhesive fibers and/or hot-melt adhesive fibers 4 can be embodied individually or preferably as a complete fiber layer.

The adhesive fibers and/or hot-melt adhesive fibers are applied with a mass application in a range from 1 g/m5 to 10 g/m5, preferably 4 g/m5 to 6 g/m5, onto the substrate layer 2 or onto the sequence of substrate and nanofiber layers 2 and 3.

The adhesive fibers and/or hot-melt adhesive fibers 4 can be applied by a hot injection process or spraying process onto the substrate layer 2 prior to application of the nanofiber layer 3 or alternatively after application of the nanofiber layer 3 onto the entirety of the two material layers 2 and 3.

Preferably, the adhesive fibers and/or hot-melt adhesive fibers comprise at least 20 wt %, preferably more than 65 wt %, of a thermoplastic synthetic material or an adhesively acting fiber material. Particularly preferred, this can be a polyolefin, a polyester and/or a polyamide. The average fiber diameter of the adhesive fibers and/or hot-melt adhesive fibers can amount to preferably 5 Φm to 50 Φm, particularly preferred 7 Φm to 14 Φm. The remaining wt % up to 100 wt % encompass in particular fillers such as, for example, calcium carbonate.

As adhesively acting fiber material, e.g. a fiber material can be used that is partially dissolved, e.g., by using a solvent-containing adhesive. Alternatively or additionally, the adhesive fibers 4 themselves can be comprised of an adhesively acting material or can be provided with an adhesively acting coating.

The application of adhesive fibers and/or hot-melt adhesive fibers 4 onto the surface of the substrate layer 2 and nanofiber layer 3 enables, as a first layer at the inflow side, a protection (e.g., handling protection) of the nanofiber layer 3 because the adhesive fibers and/or hot-melt adhesive fibers 4, due to their multiple times greater diameter are mechanically significantly more stable than the nanofibers of the nanofiber layer 3.

The filter medium 1 with the different material layers 2, 3, and 4 is foldable and can be embodied as a folded filter.

Preferably, the filter medium 1 comprises three material layers, namely the substrate layer 2, the nanofiber layer 3, and the hot-melt adhesive fibers 4 or the hot-melt fiber layer.

In a further preferred embodiment variant, the nanofiber layer 3 is arranged to immediately adjoin the substrate layer 2.

The hot-melt adhesive fibers 4 in a further preferred embodiment variant are fused with the substrate layer 2 at least in sections. Also, the nanofibers of the nanofiber layer 3 comprise fused spots with the hot-melt adhesive fibers 4 as connecting points.

The weight per surface area of the filter medium 1 is in a range from 50 g/m5 to 250 g/m5.

In a preferred embodiment variant, the connection is realized without additional binders exclusively by means of the adhesive fibers and/or hot-melt adhesive fibers 4.

The average surface area of a window in the aforementioned defined surface section, which is delimited by the respective adhesive fibers and/or hot-melt adhesive fibers, preferably amounts to at least 500 Φm5.

The filter medium 1 according to the invention is suitable for use in industrial filters or for filtration of engine intake air of internal combustion engines. Alternatively, the filter medium 1 can also be used in eroding machines, as air filter in driver cabins or as liquid filter. Also, a use in fuel or oil filters is conceivable with properly selected material.

Provided that the nanofiber layer 3 and the adhesive fibers and/or hot-melt adhesive fibers 4 are located at the inflow side relative to the substrate layer 2, a handling protection or a protection against mechanical damage of the nanofiber layer 3 is achieved which was not ensured in the past with conventional filter media.

Provided that the nanofiber layer 3 and the adhesive fibers and/or hot-melt adhesive fibers 4 are located at the outflow side relative to the substrate layer 2, the adhesive force of the nanofibers on the substrate layer 2 is significantly increased. A good mechanical support and a stable connection of the nanofiber layer 3 to the substrate layer 2 is enabled. As a result, the filtration performance of the filter medium 1 is increased or certain applications become even possible in the first place with this configuration of the filter medium 1. This concerns filtration applications with high volume flows, e.g., secondary air filter elements, or applications in which a high differential pressure may occur, e.g., liquid filter elements.

The nanofiber layer 3 moreover is protected during processing of the filter medium 1 for its use in filter elements against mechanical damage. Typical processing steps are e.g. winding, embossing, folding, wrapping, and handling of the correspondingly treated medium, e.g., insertion into a filter housing of the filter element. A corresponding filter element with a filter medium embodied as a folded bellows is disclosed, for example, in DE 10 2012 019 862 A1.

By protecting the nanofiber layer 3, the filtration performance in comparison to standard nanofiber media can be increased.

In FIGS. 2 to 7, an embodiment variant of a filter medium 1 according to the invention is illustrated photographically in black-and-white view and in a color view with recognizable light/dark contrast. One can recognize individual fibers 2a of the support layer as well as the spider web-like nanofibers 3a of the nanofiber layer 3 and hot-melt adhesive fibers 4. The support layer of the fibers 2a can be realized, for example, as a polyester nonwoven and can be seen in the background. The hot-melt adhesive fibers 4 can comprise, for example, a polyolefin basic polymer and can be seen in the foreground of the images. Between the support layer of the fibers 2a and the hot-melt adhesive fibers 4, the fine nanofiber layer 3 is located which is physically protected, in particular against abrasion, by the stable coarser fibers, wherein the nanofibers 3a, for example, are made of or comprise a polyamide.

Figure 2:
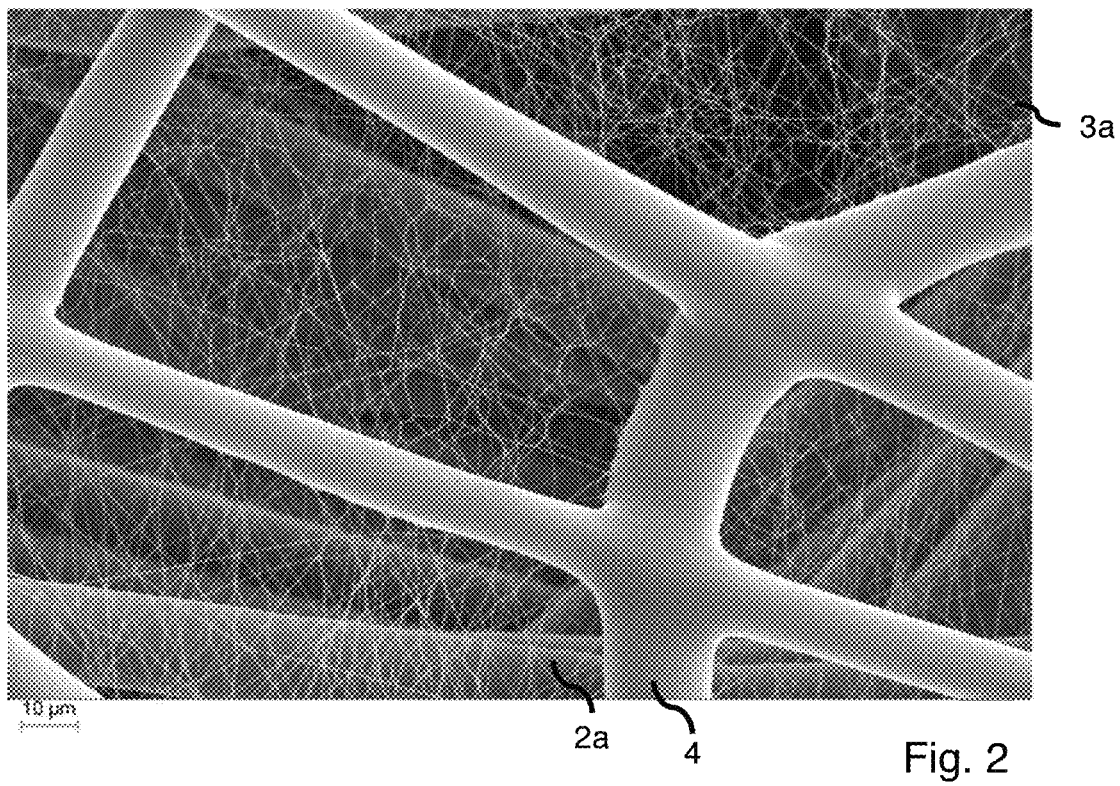
FIG. 2 is an enlarged microscopic plan view of the filter medium according to the invention in inflow direction.
Figure 3:
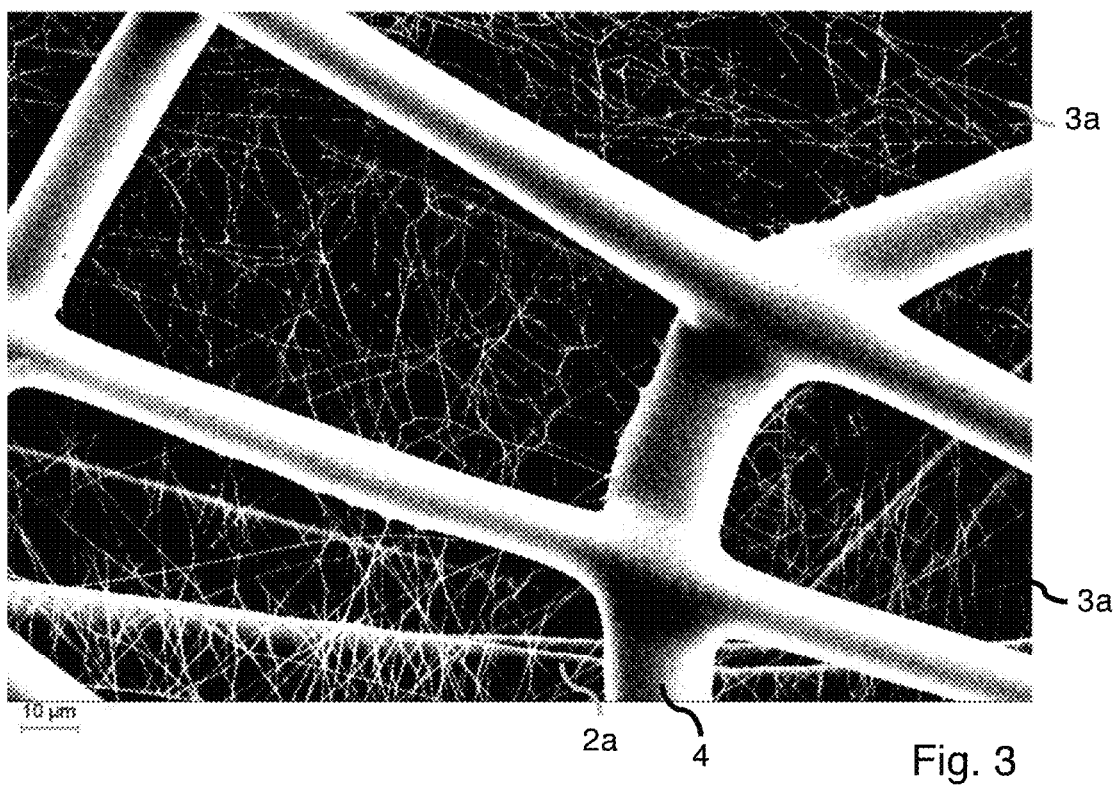
FIG. 3 shows FIG. 2 in a monochrome view.
Figure 4:
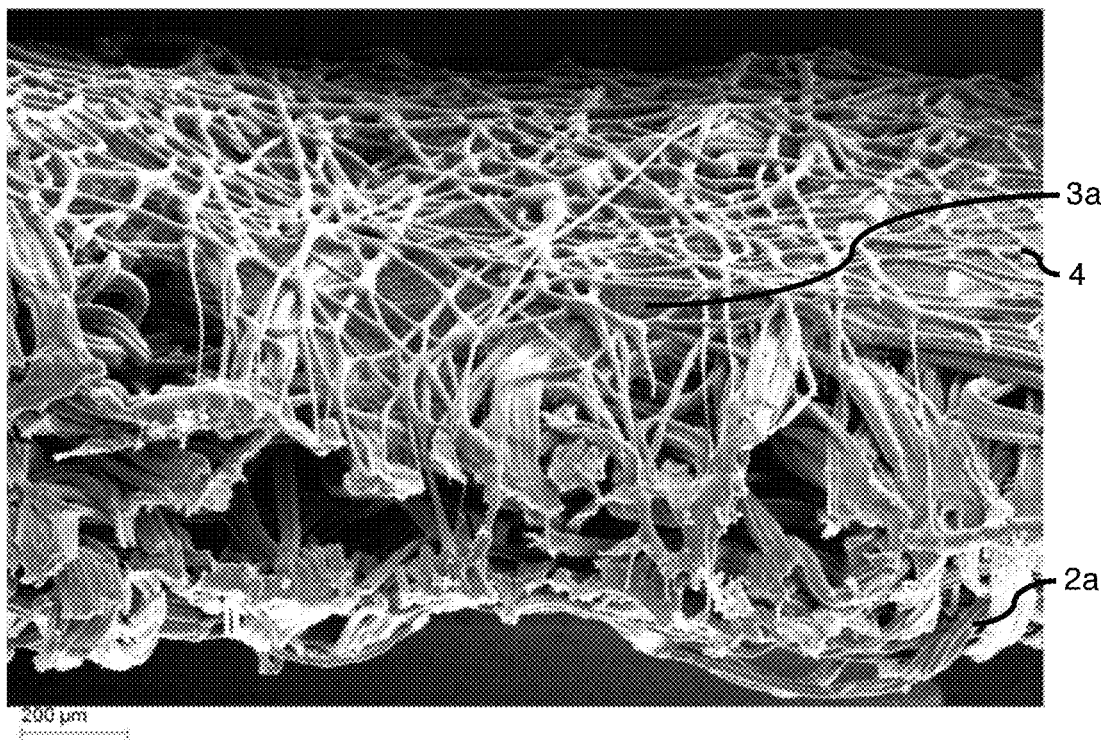
FIG. 4 is a sectional image of the filter medium according to the invention.
Figure 5:
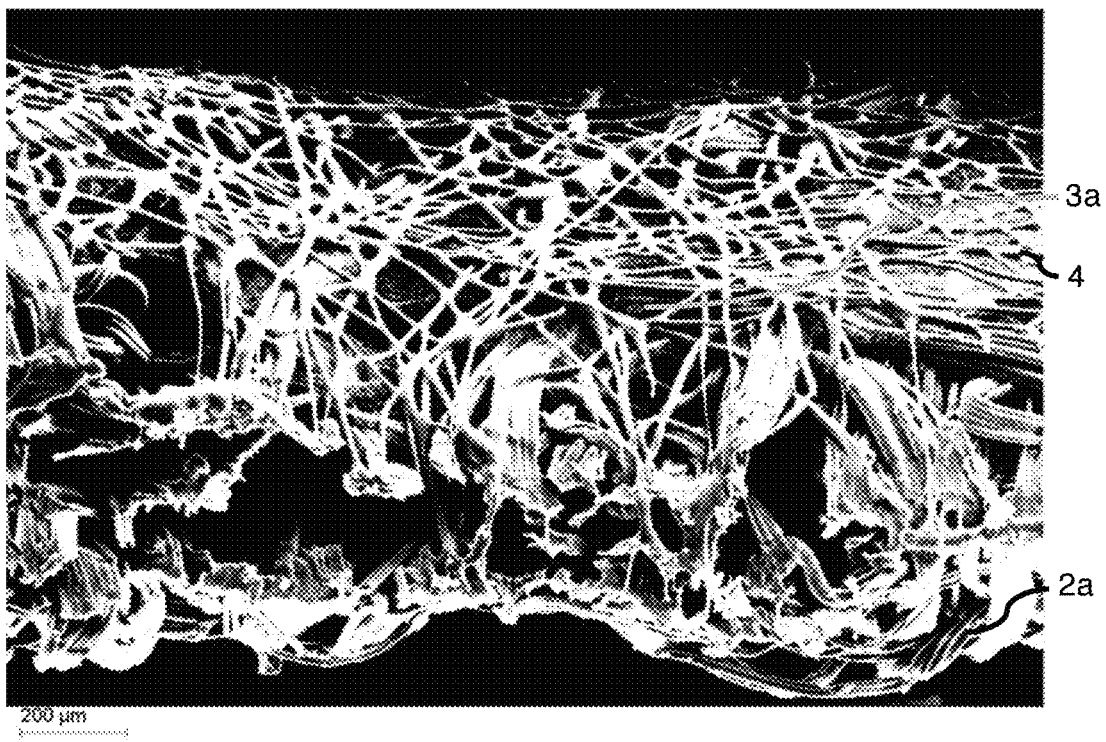
FIG. 5 shows FIG. 4 in monochrome view.
Figure 6:
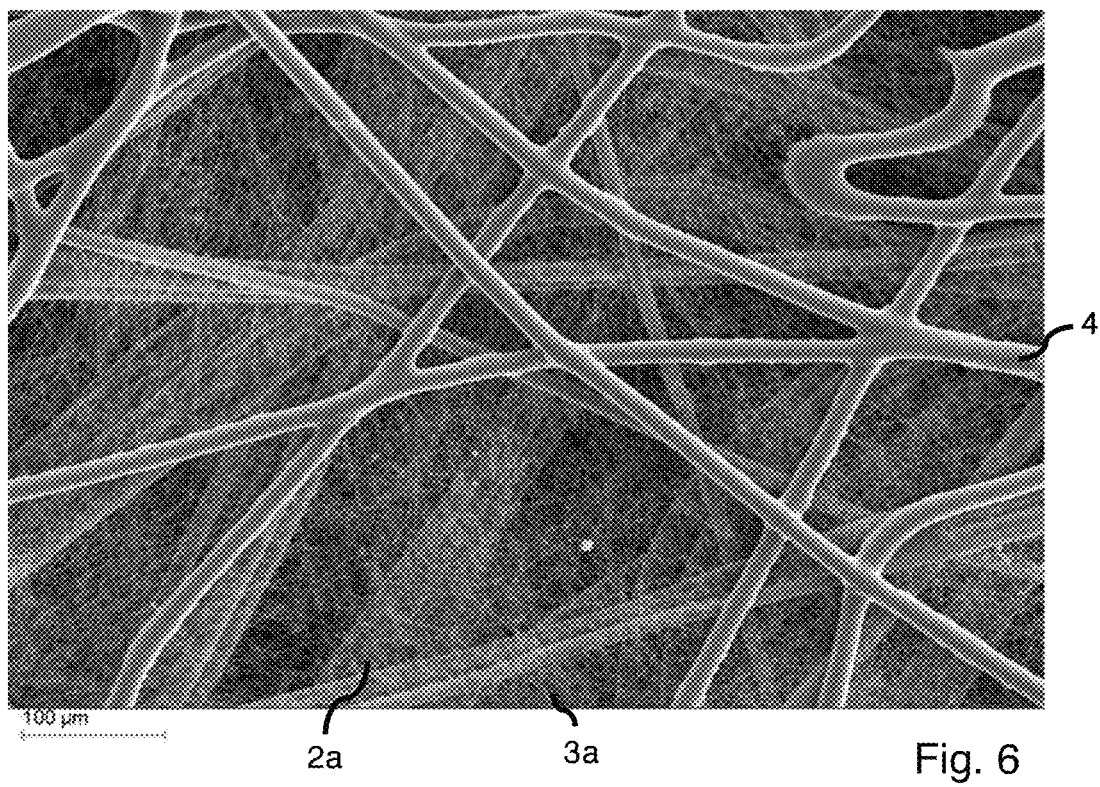
FIG. 6 is a microscopic plan view of the filter medium according to the invention in inflow direction.
Figure 7:
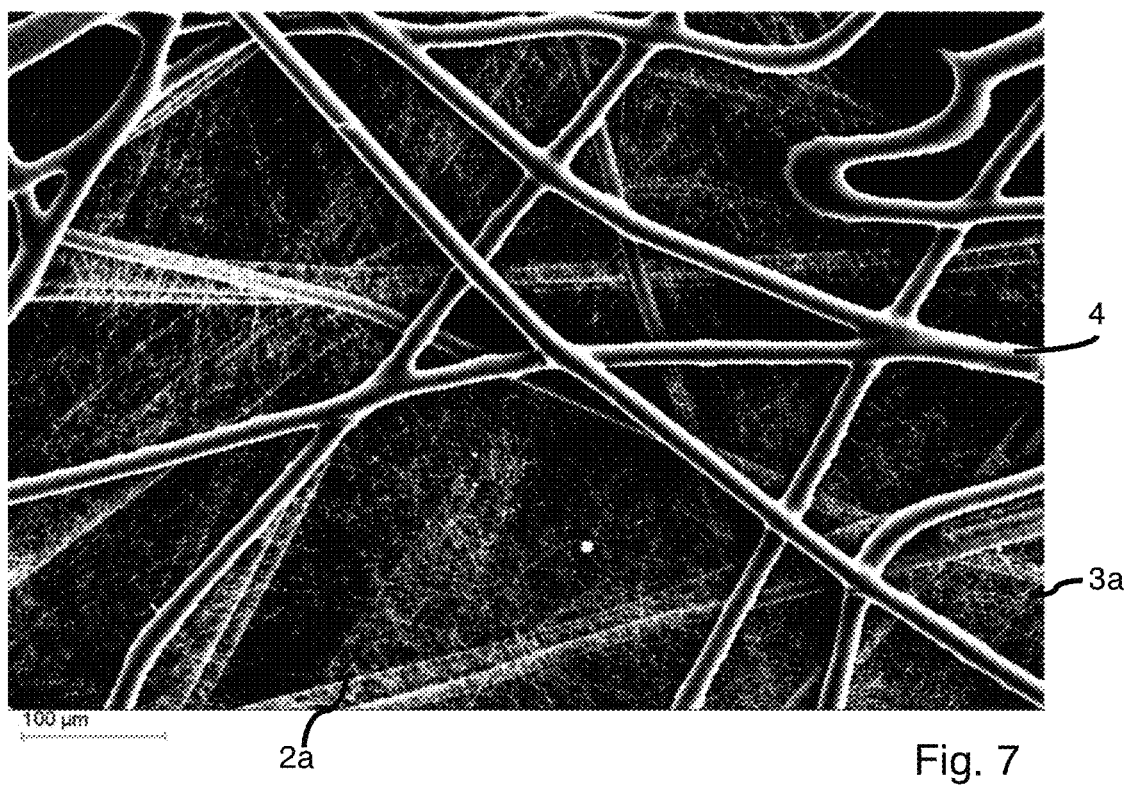
FIG. 7 shows FIG. 6 in monochrome view.

FIGS. 4 to 5 show the construction according to FIGS. 2 and 3 in cross section. FIGS. 6 and 7 show an overview photograph of the construction according to FIGS. 2 and 3 at a smaller magnification in order to show the carrier layer in the background more clearly once again.

FIGS. 2 to 7 illustrate clearly the abrasion protection for the very thin nanofibers which are thus optimally protected in particular from mechanical loading during the manufacturing process.

Figure 10:
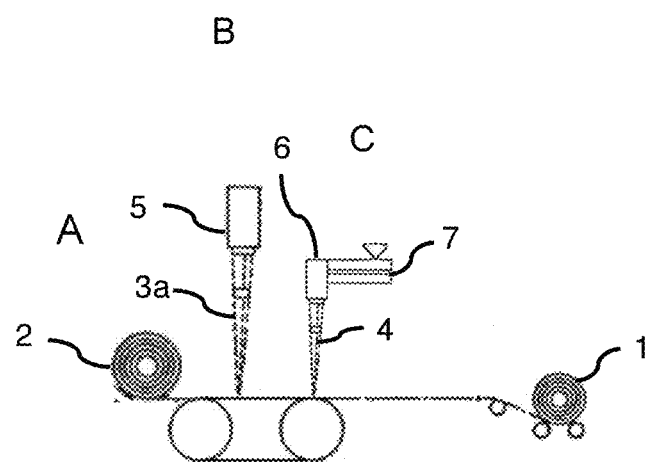
FIG. 10 is a schematic sequence of a manufacturing process illustrated in a simplified way.

FIG. 10 shows a manufacturing process for a filter medium 1 according to the invention. In this context, a substrate layer 2 is provided in a step A, for example, as a material coil.

When passing the substrate layer 2 through a first application station 5, the application of nanofibers 3a is realized which are laid onto the substrate layer and form a nanofiber layer 3 (step B). Subsequently, passage of the substrate layer 2 and nanofiber layer 3 through a second application station 6 is realized. The application station 6 may comprise, for example, a heating station 7 for producing a polymer melt. The hot-melt adhesive fibers 4 which are still partially in a liquid state are discharged by the application station 6 onto the nanofiber layer 3 (step C). In this context, the hot-melt adhesive fibers 4 wet or enclose the nanofibers 3a and at least also wet the substrate layer 2 in sections so that, upon cooling of the hot-melt adhesive fibers 4, a connection is produced between the substrate layer 2 and the nanofiber layer 3.

Finally, the hot-melt adhesive fibers cool down and formation of the filter medium 1 is realized which can then be further processed.

Figure 8:
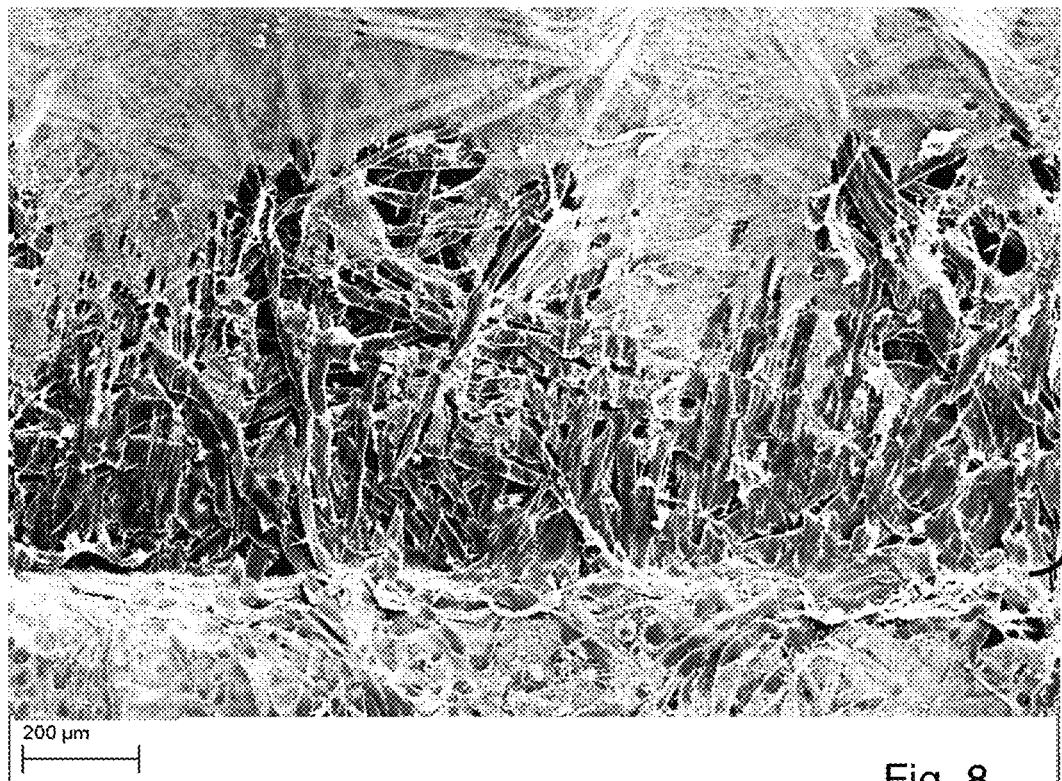
FIG. 8 is a microscopic plan view of a filter medium with a substrate layer and a nanofiber layer after mechanical loading.
Figure 9:
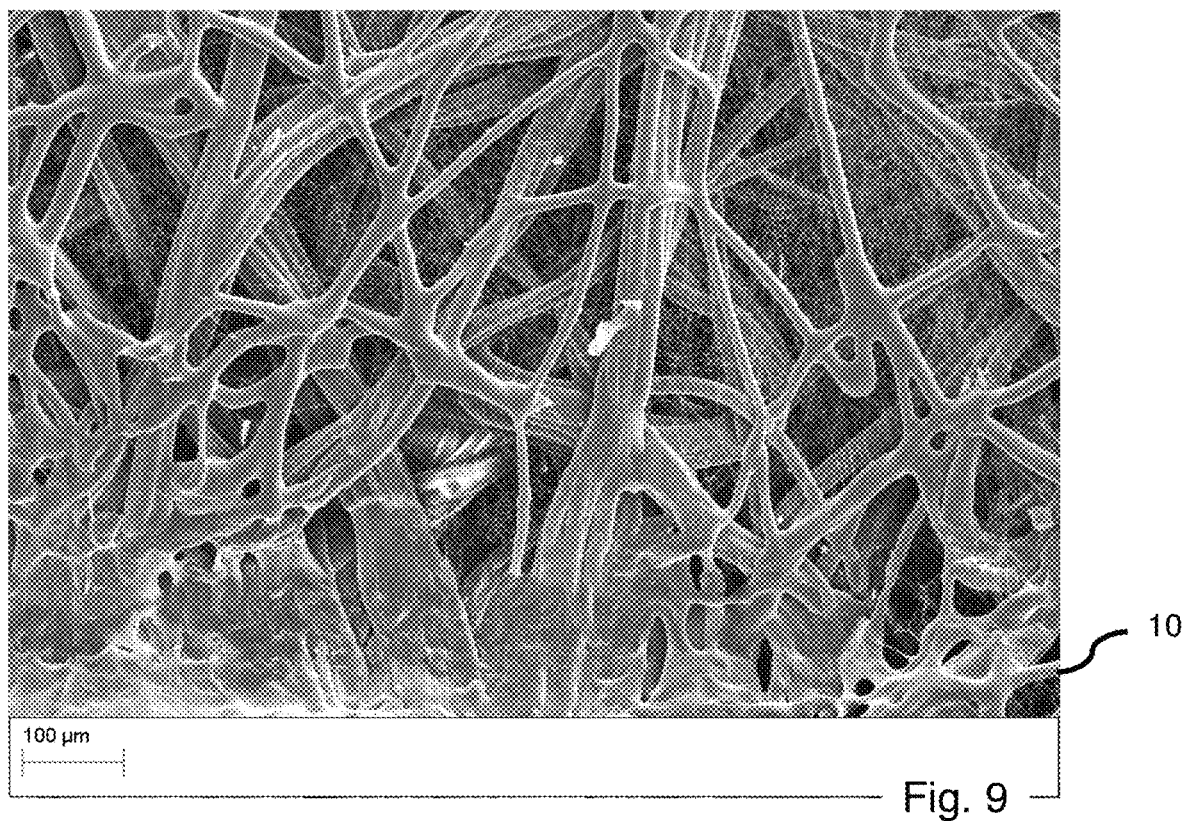
FIG. 9 is a microscopic plan view of a filter medium according to the invention with a substrate layer and a nanofiber layer on which hot-melt adhesive fibers are arranged.

A comparison in regard to the mechanical resistance for embossment of the filter medium, improved relative to conventional filter media, is illustrated in FIGS. 8 and 9 by comparison of a conventional filter medium (FIG. 8) and a filter medium according to the invention (FIG. 9).

FIGS. 8 and 9 appear already different in the SEM micrographs. This is so because the focal plane at the scanning electron microscope changes due to the hot-melt adhesive fiber layer which has been added in the filter medium according to the invention (FIG. 9) compared to the conventional filter medium shown in FIG. 8. Due to the different focal planes of FIGS. 8 and 9, in FIG. 8 the nanofiber layer can be represented with significantly better contrast. This representation is not possible in FIG. 9 due to the additional hot-melt adhesive fiber layer. Both filter media have been embossed, a conventional further processing step in which the filter medium is mechanically particularly strongly stressed. Upon processing of the filter medium to the finished element, the filter medium is wound multiple times and by means of steel rollers different structures are embossed in order to ensure the subsequent folding of the medium. In this context, a strong mechanical friction and shearing of the fine fibers of the filter medium is generated, in particular on finest fibers, such as nanofiber layers, for example.

FIG. 8 shows the conventional filter medium with a substrate layer (polyester nonwoven) and nanofibers (polyamide) but without hot-melt adhesive fibers covering the nanofiber layer. In FIG. 8, it can be clearly seen that the thus unprotected nanofibers at the surface have been destroyed by the embossment and thus their functionality in the filter medium is already significantly limited or destroyed already during embossment. FIG. 9 shows in comparison the filter medium according to the invention according to FIGS. 2 to 7 with hot-melt adhesive fibers 4 after embossment. The nanofibers 3a of the nanofiber layer 3 are not destroyed and therefore maintain their functionality in the filter medium even after embossment. The fine nanofiber structure 3 underneath the hot-melt adhesive fiber layer 4 is still completely maintained even in the direct rim regions of embossment in FIG. 9. On the other hand, FIG. 8 shows, after identical mechanical loading, a great damage and abrasion of the nanofiber layer in the entire region of the embossment and in particular in the folding edge 10.

What is claimed is:

1. A filter medium comprising:
    a substrate layer, wherein the substrate layer is nonwoven fiber layer comprising at least 90 wt % of cellulose fibers; at least 90 wt % of synthetic fibers; or at least 90 wt % of cellulose fibers and synthetic fibers,
    wherein the substrate layer has a first flow side, wherein the first flow side is either an inflow side or an outflow side of the substrate layer;
    a nanofiber layer having a first side arranged directly on the first flow side of the substrate layer, the nanofiber layer comprising synthetic nanofibers having diameters in a range of 50 nm to 500 n m;
    a hot-melt adhesive fiber layer arranged on a second side of the nanofiber layer such that the nanofiber layer is arranged between the substrate layer and the hot melt adhesive fiber layer, wherein the a hot-melt adhesive fiber layer is made of a different material than both the nanofiber layer and the substrate layer;
    wherein the hot-melt adhesive layer is a separate layer from the nanofiber layer and the substrate layer, the hot-melt adhesive layer is applied onto the second side of the nanofiber layer, wherein the second site is opposite the first side of the nanofiber layer which is arranged directly on the substrate layer;
    wherein the hot-melt adhesive fiber layer is applied while wet onto the second side of the nanofiber layer, such that the material of the hot melt adhesive fibers of the hot-melt adhesive fiber layer wet or enclose the synthetic nanofibers of the nanofiber layer, the material of the hot-melt adhesive fibers of the hot-melt adhesive fiber enclose the synthetic nanofibers thereby connecting and fixing the nanofiber layer onto the substrate layer;
    wherein the material of the hot melt adhesive fibers consists of one or more compounds selected from the group consisting of polyurethane, amorphous polyalphaolefins, poly(ethylene-co-vinyl acetate) polymers (PEVA), polyester elastomers (TPE-E), polyurethane elastomers (TPE-U), copolyamide elastomers (TPE-A), and vinyl pyrrolidone/vinyl, acetate copolymers wherein nanofibers of the nanofiber layer and the substrate layer each comprise connecting regions with the hot-melt adhesive fibers, wherein in the connecting regions a material fusion between the hot-melt adhesive fibers and the nanofibers of the nanofiber layer or the substrate layer exists.

2. The filter medium according to claim 1, wherein the hot-melt adhesive fibers are applied onto the nanofiber layer with a mass application in a range from 1 g/m$^2$ to 10 g/m$^2$.

3. The filter medium according to claim 2, wherein the mass application is in a range from 4 g/m$^2$ to 6 g/m2.

4. The filter medium according to claim 1, wherein the substrate layer is carded nonwoven; a spunbonded nonwoven; or a carded nonwoven and a spunbonded nonwoven.

5. The filter medium according to claim 1, wherein the hot-melt adhesive fibers comprise a cross-sectional area which is at least three times that of a cross-sectional area of nanofibers of the nanofiber layer.

6. The filter medium according to claim 5, wherein the cross-sectional area of the hot-melt adhesive fibers is at least eight times that of the cross-sectional area of the nanofibers of the nanofiber layer.

7. The filter medium according to claim 1, wherein the nanofibers of the nanofiber layer have a melting point temperature;

wherein the hot-melt adhesive fibers have a different melting point temperature that is less than the melting point temperature of the nanofibers of the nanofiber layer.

8. The filter medium according to claim 1, wherein the hot-melt adhesive fibers delimiting a window comprising an average window size of a surface section that amounts to at least 500 Φm5 per cm2.

9. The filter medium according to claim 1, wherein the filter medium is comprised exclusively of the substrate layer, the nanofiber layer, and the hot-melt adhesive fibers.

10. The filter medium according to claim 1, wherein more than 70% of a surface of the nanofiber layer is arranged at an inflow side or an outflow side of the substrate layer and is not covered.

11. The filter medium according to claim 10, wherein said more than 70% of the surface of the nanofiber layer is not covered by the hot-melt adhesive fibers.

12. The filter medium according to claim 10, wherein more than 90% of the surface of the nanofiber layer arranged at the inflow side or the outflow side of the substrate layer is not covered by the hot-melt adhesive fibers.

13. A filter element comprising a filter medium according to claim 1, wherein the filter medium is in a folded, embossed, and/or wound form; or the filter element comprising a wrapping of one or more layers about an exterior of the filter element, the wrapping comprised of the filter medium according to claim 1.

* * * * *